US011659491B2

(12) United States Patent
Fong et al.

(10) Patent No.: US 11,659,491 B2
(45) Date of Patent: May 23, 2023

(54) MULTIPLEXING TRANSMIT POWER CONTROL INFORMATION AND SIDELINK DATA TRAFFIC

(71) Applicant: QUALCOMM Incorporated, San Diego, CA (US)

(72) Inventors: Lik Hang Silas Fong, Bridgewater, NJ (US); Junyi Li, Fairless Hills, PA (US); Xiaoxia Zhang, San Diego, CA (US); Piyush Gupta, Bridgewater, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/391,461

(22) Filed: Aug. 2, 2021

(65) Prior Publication Data

US 2023/0030712 A1 Feb. 2, 2023

(51) Int. Cl.
| | | |
|---|---|---|
| *H04W 52/14* | (2009.01) | |
| *H04W 52/08* | (2009.01) | |
| *H04W 72/04* | (2023.01) | |
| *H04W 72/1263* | (2023.01) | |
| *H04W 72/12* | (2023.01) | |
| *H04W 92/18* | (2009.01) | |

(52) U.S. Cl.
CPC ........... *H04W 52/14* (2013.01); *H04W 52/08* (2013.01); *H04W 72/0406* (2013.01); *H04W 72/1263* (2013.01); *H04W 92/18* (2013.01)

(58) Field of Classification Search
CPC . H04W 52/14; H04W 52/08; H04W 72/0406; H04W 72/1263; H04W 92/18
See application file for complete search history.

(56) References Cited

U.S. PATENT DOCUMENTS

| | | | |
|---|---|---|---|
| 9,961,487 B1 * | 5/2018 | Miao | H04W 4/029 |
| 2016/0338094 A1 * | 11/2016 | Faurie | H04W 72/14 |
| 2016/0353450 A1 * | 12/2016 | Miao | G01S 5/0263 |
| 2018/0019794 A1 * | 1/2018 | Kowalski | H04L 5/003 |
| 2018/0020335 A1 * | 1/2018 | Yin | H04L 1/1854 |

(Continued)

FOREIGN PATENT DOCUMENTS

| | | | | |
|---|---|---|---|---|
| WO | WO-2016182601 A1 * | 11/2016 | | H04W 72/1289 |
| WO | WO-2019195505 A1 * | 10/2019 | | H04L 1/0041 |

(Continued)

*Primary Examiner* — Nathan S Taylor
(74) *Attorney, Agent, or Firm* — Norton Rose Fulbright LLP

(57) ABSTRACT

This disclosure provides systems, methods, and devices for wireless communication that support closed-loop transmit power control (TPC) for user equipment (UE) sidelink communications. TPC information may be provided, by a first UE receiving transmissions from a second UE, with respect to a sidelink implemented between the UEs. TPC information may be multiplexed with sidelink data traffic in a sidelink communication between UEs. The TPC information may include a TPC indicator and one or more TPC messages for providing TPC commands with respect to one or more sidelinks. The sidelink data traffic of some examples may include data-only traffic, such as semi-persistent scheduled (SPS) data traffic, that is decoupled from accompanying sidelink control information (SCI). Other aspects and features are also claimed and described.

30 Claims, 7 Drawing Sheets

(56) References Cited

U.S. PATENT DOCUMENTS

| | | | |
|---|---|---|---|
| 2018/0123744 A1* | 5/2018 | Nogami | H04L 1/1854 |
| 2020/0022089 A1* | 1/2020 | Guo | H04W 52/346 |
| 2020/0221429 A1* | 7/2020 | Li | H04W 72/042 |
| 2020/0260472 A1* | 8/2020 | Ganesan | H04L 1/08 |
| 2021/0194571 A1* | 6/2021 | Ma | H04B 7/18558 |
| 2021/0243841 A1* | 8/2021 | Yasukawa | H04W 28/04 |
| 2021/0410084 A1* | 12/2021 | Li | H04W 52/265 |
| 2022/0022241 A1* | 1/2022 | Zhang | H04W 72/1273 |
| 2022/0039021 A1* | 2/2022 | Ryu | H04W 52/242 |
| 2022/0110143 A1* | 4/2022 | Ganesan | H04W 72/121 |

FOREIGN PATENT DOCUMENTS

| | | | | |
|---|---|---|---|---|
| WO | WO-2020069175 A1 * | 4/2020 | | H04W 52/242 |
| WO | WO-2021023380 A1 * | 2/2021 | | H04W 24/04 |

* cited by examiner

MULTIPLEXING TRANSMIT POWER CONTROL INFORMATION AND SIDELINK DATA TRAFFIC

TECHNICAL FIELD

Aspects of the present disclosure relate generally to wireless communication systems, and more particularly, to transmit power control (TPC) information provided with respect to user equipment (UE) sidelink communication. Certain embodiments of the technology discussed below can enable and provide multiplexing of TPC information and sidelink data traffic, such as data-only semi-persistent scheduled (SPS) traffic and/or other sidelink data traffic that is decoupled from accompanying sidelink control information (SCI). Some features may enable and provide improved communications, including controlling adjustment of sidelink transmit power to reduce interference and/or facilitate high reliability.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

The UEs may comprise various device configurations, such as a mobile wireless device, an Internet of Things (IoT) or Internet of Everything (IoE) device, etc., and may have particular associated communication needs and/or requirements. For example, latency and reliability requirements for Industrial Internet of Things (IIoT) traffic are stringent (e.g., latency≈1-2 ms and reliability ≈$10^{-5}$-$10^{-6}$ block error rate (BLER)). The aforementioned interference presents challenges with respect to some wireless communications meeting needs and/or requirements of the particular wireless devices and situations.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication may include transmitting, by a first user equipment (UE) to a second UE via a sidelink control channel portion of a sidelink communication between the first UE and the second UE, sidelink control information (SCI) that includes a transmit power control (TPC) indicator and a TPC message. The method may also include transmitting, by the first UE to the second UE via a sidelink traffic channel portion of the sidelink communication, sidelink traffic for the second UE.

In an additional aspect of the disclosure, an apparatus includes at least one processor and a memory coupled to the at least one processor. The at least one processor may be configured to transmit, by a first UE to a second UE via a sidelink control channel portion of a sidelink communication between the first UE and the second UE, SCI that includes a TPC indicator and a TPC message. The at least one processor may also be configured to transmit, by the first UE to the second UE via a sidelink traffic channel portion of the sidelink communication, sidelink traffic for the second UE.

In an additional aspect of the disclosure, an apparatus may include means for transmitting, by a first UE to a second UE via a sidelink control channel portion of a sidelink communication between the first UE and the second UE, SCI that includes a TPC indicator and a TPC message. The apparatus may also include means for transmitting, by the first UE to the second UE via a sidelink traffic channel portion of the sidelink communication, sidelink traffic for the second UE.

In an additional aspect of the disclosure, a non-transitory computer-readable medium stores instructions that, when executed by a processor, cause the processor to perform operations. The operations may include transmitting, by a first UE to a second UE via a sidelink control channel portion of a sidelink communication between the first UE and the second UE, SCI that includes a TPC indicator and a TPC message. The operations may also include transmitting, by the first UE to the second UE via a sidelink traffic channel portion of the sidelink communication, sidelink traffic for the second UE.

In one aspect of the disclosure, a method for wireless communication may include receiving, by a first UE from a second UE via a sidelink control channel portion of a sidelink communication between the second UE and the first UE, SCI that includes a TPC indicator and a TPC message. The method may also include receiving, from the second UE by the first UE via a sidelink traffic channel portion of the sidelink communication, sidelink traffic for the first UE.

In an additional aspect of the disclosure, an apparatus includes at least one processor and a memory coupled to the at least one processor. The at least one processor may be configured to receive, by a first UE from a second UE via a sidelink control channel portion of a sidelink communication between the second UE and the first UE, SCI that includes a TPC indicator and a TPC message. The at least one processor may also be configured to receive, by the first UE from the second UE via a sidelink traffic channel portion of the sidelink communication, sidelink traffic for the first UE.

In an additional aspect of the disclosure, an apparatus may include means for receiving, by a first UE from a second UE via a sidelink control channel portion of a sidelink communication between the second UE and the first UE, SCI that includes a TPC indicator and a TPC message. The apparatus may also include means for receiving, by the first UE from the second UE via a sidelink traffic channel portion of the sidelink communication, sidelink traffic for the first UE.

In an additional aspect of the disclosure, a non-transitory computer-readable medium stores instructions that, when executed by a processor, cause the processor to perform operations. The operations may include receiving, by a first UE from a second UE via a sidelink control channel portion of a sidelink communication between the second UE and the first UE, SCI that includes a TPC indicator and a TPC message. The operations may also include receiving, by the first UE from the second UE via a sidelink traffic channel portion of the sidelink communication, sidelink traffic for the first UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
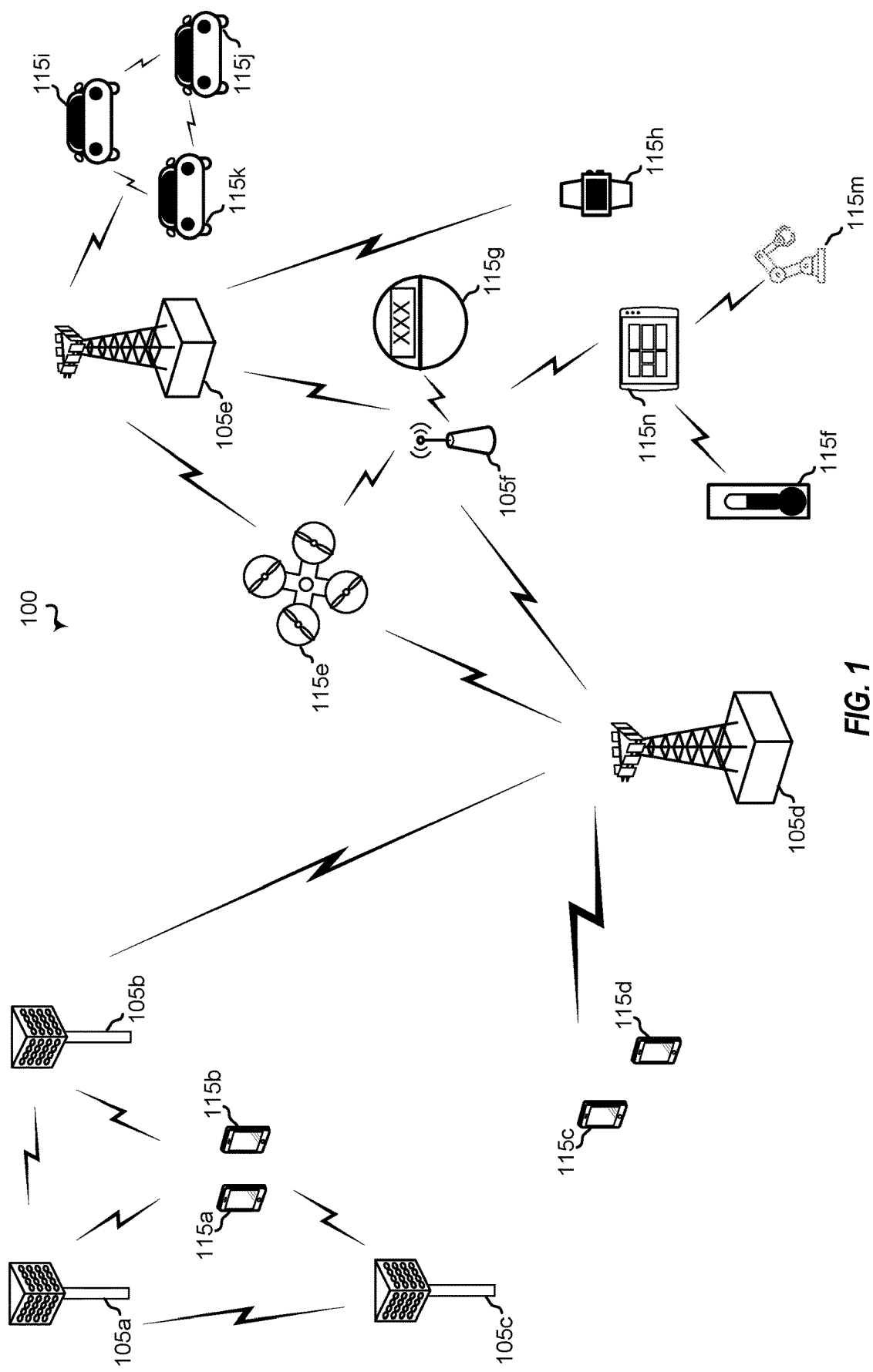
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Aspects of the present disclosure enable and provide closed-loop transmit power control (TPC) for user equipment (UE) sidelink communications. For example, TPC information may be provided, by a first UE receiving transmissions from a second UE, with respect to a sidelink implemented between the UEs. In accordance with some aspects of the disclosure, TPC information is multiplexed with sidelink data traffic in a sidelink communication between UEs. The TPC information may, for example, include a TPC indicator and one or more TPC messages for providing TPC commands with respect to one or more sidelinks. The sidelink data traffic of some examples may include data-only semi-persistent scheduled (SPS) data traffic and/or other sidelink data traffic that is decoupled from accompanying sidelink control information (SCI). The present disclosure provides systems, apparatus, methods, and computer-readable media that support closed-loop TPC for UE sidelink communications.

Particular implementations of the subject matter described in this disclosure may be implemented to realize one or more of the following potential advantages or benefits. In some aspects, the present disclosure provides techniques for facilitating closed-loop TPC with respect to sidelink communication using an interface, such as a vehicle-to-vehicle (V2V) or vehicle-to-everything (V2X) interface, that does not directly support closed-loop TPC. Some features may enable and provide improved communications, including controlling adjustment of sidelink transmit power to reduce interference and/or facilitate high reliability. For example, a UE in the form of an industrial controller which receives messages from multiple UEs in the form of sensors/actuators (S/As) may communicate TPC information multiplexed with sidelink data traffic to adjust the transmit power of one or more S/A, such as to lower the S/A transmit power to reduce interference to other S/As or to increase the S/A transmit power to improve the received signal-to-interference-plus-noise ratio (SINR) (e.g., improve reliability). As a further example, a UE in the form of a S/A which receives messages from a UE in the form of an industrial controller may communicate TPC information to adjust the transmit power of the industrial controller, such as to lower the industrial controller transmit power to reduce interference or to increase the industrial controller transmit power to improve the received SINR.

As may be appreciated from the above, this disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user UEs. A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi- Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), UE 115h (wearable device), UE 115m (robotic actuator), and UE 115n (industrial controller) may communicate through wireless network 100 either directly with base stations, such as small cell base station 105f, and macro base station 105e, or in multi-hop configurations by communicating with another user device which relays its information to the network, such as UE 115f communicating temperature measurement information to the industrial controller, UE 115n, which may utilize the data and/or report the data to the network (e.g., for transmission to another device, such as another industrial controller, sensor, actuator, etc.) through small cell base station 105f. Wireless network 100 may also provide additional network efficiency through dynamic, low-latency TDD communications or low-latency FDD communications, such as in a V2V or V2X mesh network between UEs 115i-115k communicating with macro base station 105e.

Figure 2:
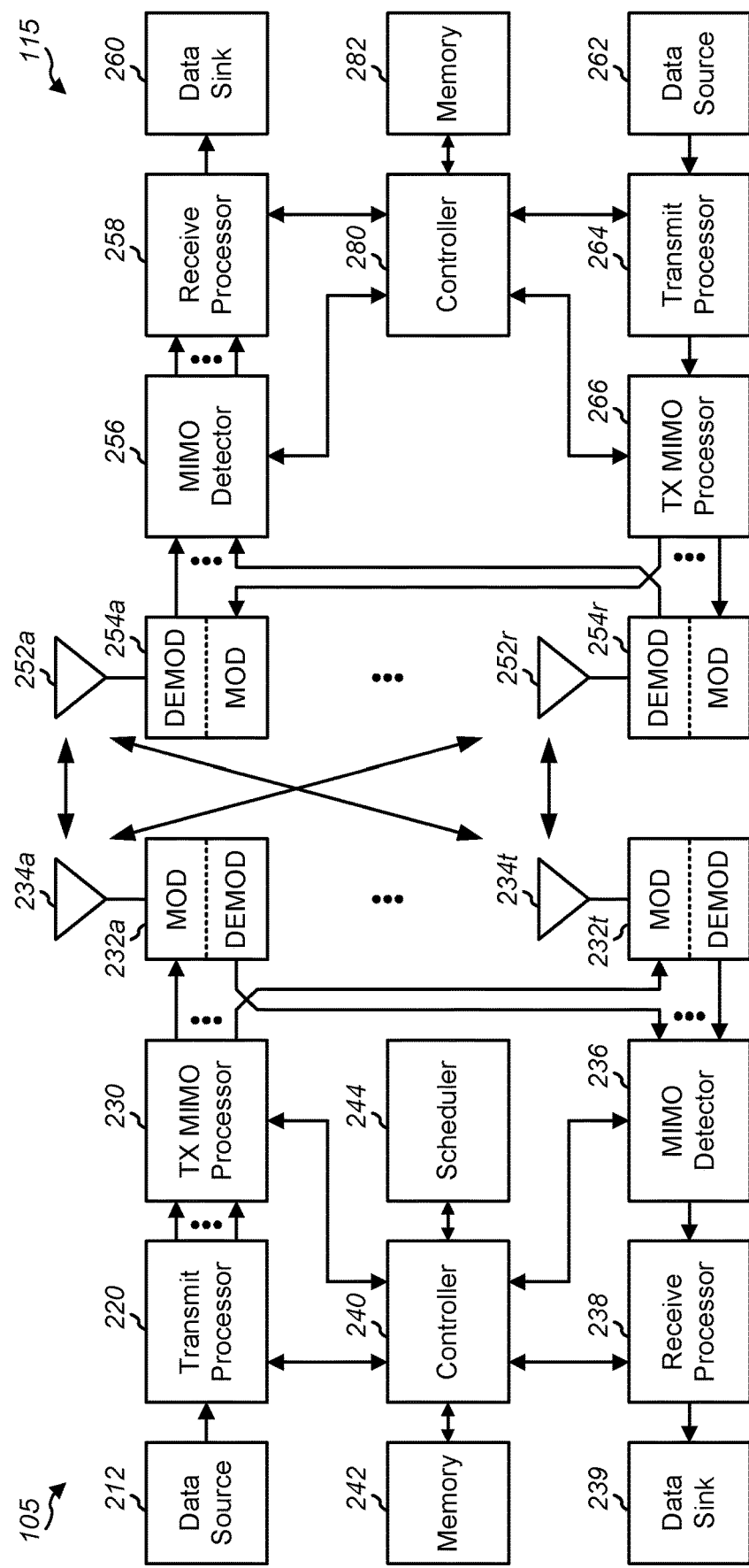
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 6 and 7, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In an example implementation of wireless network 100, one or more of UEs 115 may comprise various forms of IoT devices, such as industrial Internet of things (IIoT) devices, in communication via wireless links of wireless network 100. For example, IIoT devices of some deployments may comprise sensors (e.g., position sensors, temperature sensors, pressure sensors, power sensors, moisture sensors, motion detectors, proximity detectors, accelerometers, scanners, cameras, probes, switches, etc.) and/or actuators (e.g., linear actuators, rotary actuators, servomechanisms, solenoids, stepper motors, electric motors, comb drive actuators, etc.). A large number of IIoT devices may be in communication with a corresponding device, such as an industrial controller (e.g., computer, programmable logic controller (PLC), supervisory control and data acquisition (SCADA) system, etc.), of a control network in an industrial environment, such as a manufacturing facility, materials processing facility, warehouse, etc. For example, a PLC may be in communication with 20-50 sensors and/or actuators, wherein 100-1000 such PLCs may be deployed throughout an industrial (e.g., manufacturing) facility.

Figure 3:
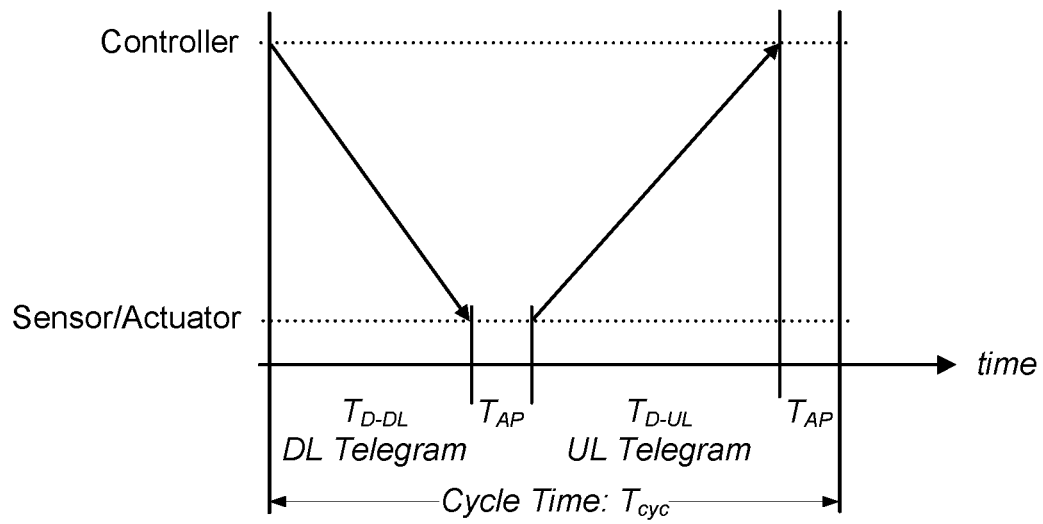
FIG. 3 is a diagram illustrating the deterministic and periodic nature of industrial Internet of things (IIoT) traffic according to some aspects.

The various IIoT devices of an industrial environment control network may periodically communicate information (e.g., measurements, state information, command acknowledgments, etc.) to and/or receive information (e.g., commands, parameters, settings, state information, etc.) from an associated industrial controller. For example, cyclic exchanges may be performed between an industrial controller and a large number of IIoT devices of a control network. Accordingly, the IIoT traffic may be deterministic and periodic, as represented in the diagram of FIG. 3. This IIoT traffic may comprise relatively small application-layer payload, such as on the order of 40 to 256 bytes. Thus it may be desirable to minimize overhead, such as due to various headers, with respect to this traffic.

Latency and reliability requirements for IIoT traffic are often stringent since output results typically must be produced in response to input conditions within a limited time to avoid unintended, and even dangerous, operation of an industrial process. For example, latency requirements of IIoT traffic may be on the order of 1-2 ms and the reliability requirements may be on the order of $10^{-5}$ to $10^{-6}$ block error rate (BLER). Accordingly, both data and control channels of an industrial environment control network may be configured to meet these overall requirements.

Control networks in industrial environments may use wireline communication links. For example, IIoT devices may be in communication with a corresponding industrial controller using wired network links, such as 100 base T Ethernet links. Such a control network may be quite complicated with respect to establishing and maintaining the network links, reconfiguring the network, etc. For example, the task of reconfiguring a control network including a large number of IIoT devices deployed on a factory floor can be costly in both time and expense.

There is interest in making industrial environment control network connectivity wireless. Industrial environment control networks utilizing wireless links may, for example, reduce the time and expense required for reconfiguration of the control network on the factory floor. However, establishing and maintaining reliable wireless links between an industrial controller and the IIoT devices associated therewith can be problematic. For example, the industrial controllers are generally located close to machinery which may cause issues (e.g., shadowing, electrical noise, etc.) in maintaining a reliable and adequate communication link with ones of the many IIoT devices of the control network. Moreover, the latency and reliability requirements for IIoT traffic can prove challenging to meet in a wireless control network implementation.

Figure 4:
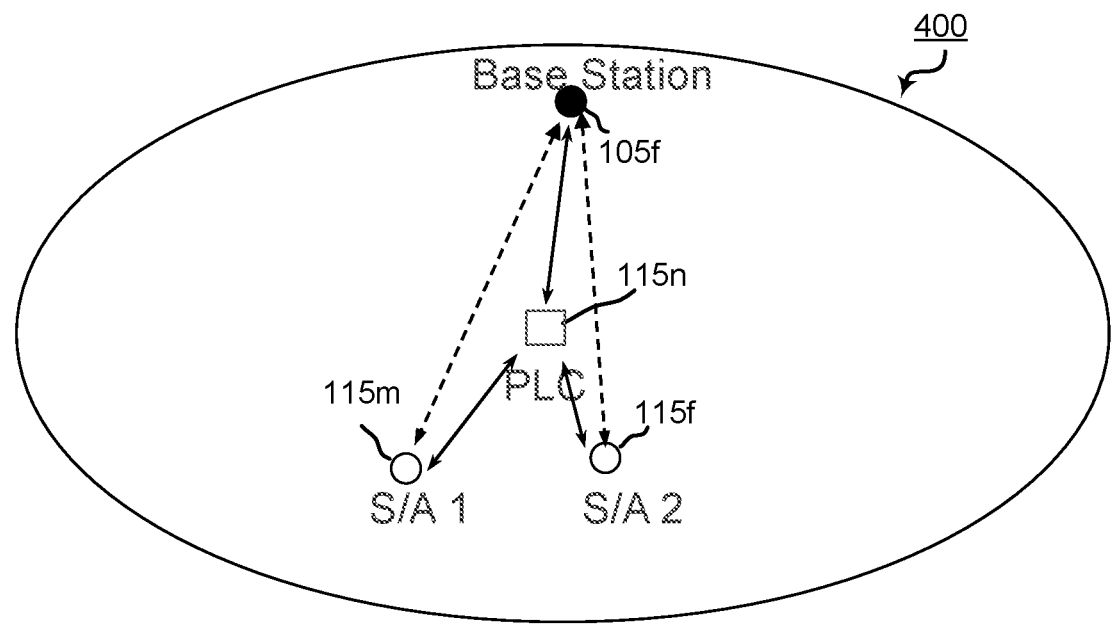
FIG. 4 is a portion of a wireless network forming an industrial environment control network according to some aspects.

The example of FIG. 4 shows a portion of wireless network 100 forming industrial environment control network 400 in which base station 105$f$ (e.g., a small cell base station), which may be ceiling mounted, and multiple UEs (shown as UEs 115$f$, 115$m$, and 115$n$) are deployed for facilitating one or more industrial processes. In an example, UE 115$n$ may comprise a PLC configuration, UE 115$f$ may comprise a sensor configuration (e.g., temperature sensor), and UE 115$m$ may comprise an actuator configuration (e.g., a robotic actuator). In operation, UE 115$n$ may operate to control aspects of an industrial process, such as by obtaining information from one or more sensors (e.g., temperature information from UE 115$f$) and controlling one or more actuator (e.g., movement of UE 115$m$) in response. Accordingly, as illustrated by the industrial environment control network configuration of FIG. 4, in addition to communicating with the network (e.g., base station 105$f$), a UE (e.g., UE 115$n$) may implement sidelinks (i.e., communication link directly between UEs) with respect to one or more other UEs (e.g., UE 115$f$ and UE 115$m$). A sidelink may, for example, be implemented using a UE to UE interface such as a PC5 interface of a vehicle-to-everything (V2X) mesh network. The UEs may communicate directly with base station 105$f$ using a UE to UMTS (Uu) interface.

Although an example of FIG. 4 is described above with respect to industrial environment control network 400 in which UE 105$f$ comprises a small cell configuration, UE 115$n$ comprises a PLC configuration, UE 115$f$ comprises a thermometer sensor configuration, and UE 115$m$ comprises a robotic actuator configuration, this example configuration is merely illustrative of a control network in which concepts of the present disclosure may be applied. It should be appreciated that a control network may comprise various configurations of both base stations (e.g., macro cells, small cells, etc., or combinations thereof) and IIoT devices such as industrial controller UEs, (e.g., computers, PLCs, SCADAs, etc., or combinations thereof) and S/As (e.g., position sensors, temperature sensors, pressure sensors, power sensors, motion detectors, proximity detectors, accelerometers, scanners, cameras, probes, switches, linear actuators, rotary actuators, servomechanism, solenoid, stepper motor, electric motor, comb drive actuators, etc., or combinations thereof). Moreover, although the example of FIG. 4 illustrates a single instance of a base station, a single instance of an industrial controller, and two instances of S/A devices for simplicity, a control environment in which concepts of the present invention may be implemented may comprise different numbers of any or all of the foregoing (e.g., multiple base stations, multiple industrial controllers, and S/A devices on the order of tens, hundreds, or even thousands).

Existing V2X interface protocols provide for dynamic and configured grants (e.g., resource grants with respect to a physical sidelink control channel (PSCCH) and/or physical sidelink shared channel (PSSCH)) for sidelink communications using a PC5 interface. A dynamic grant (DG) may provide a one-time grant of sidelink resources, such as responsive to instantaneous demand/need for sidelink communication. A configured grant (CG) may provide a grant of sidelink resources enabling continued/periodic/repeated sidelink communication.

In operation according to V2X transmission mode 1 (Mode 1), a base station schedules sidelink resources to be used by a UE for sidelink transmission. A first type of sidelink resource grant (Type 1) of the V2X interface protocols uses radio resource control (RRC) to configure a UE with resources of a CG. A second type of sidelink resource grant (Type 2) of the V2X interface protocols uses downlink control information (DCI) over a PDCCH to configure a UE with resources of a DG or a CG. For example, the DCI (e.g., DCI format 3_0 message) may be a DG and provide allocation of resources to be used for sidelink communication. Alternatively, the DCI may be a CG and activate/deactivate a CG for sidelink communication.

In operation according to V2X transmission mode 2 (Mode 2), a sidelink transmit UE (sidelink TX UE) determines sidelink resources to be used by the UE for sidelink transmissions via a PC5 connection to a sidelink receive UE (sidelink RX UE). The sidelink resources used for the sidelink transmission may be selected by the sidelink TX UE from sidelink resources configured by the network (e.g., base station via Type 1 DG or CG or Type 2 CG). Additionally or alternatively, the sidelink resources used for the sidelink transmission may be selected by the sidelink TX UE from preconfigured sidelink resources.

Figure 5A:
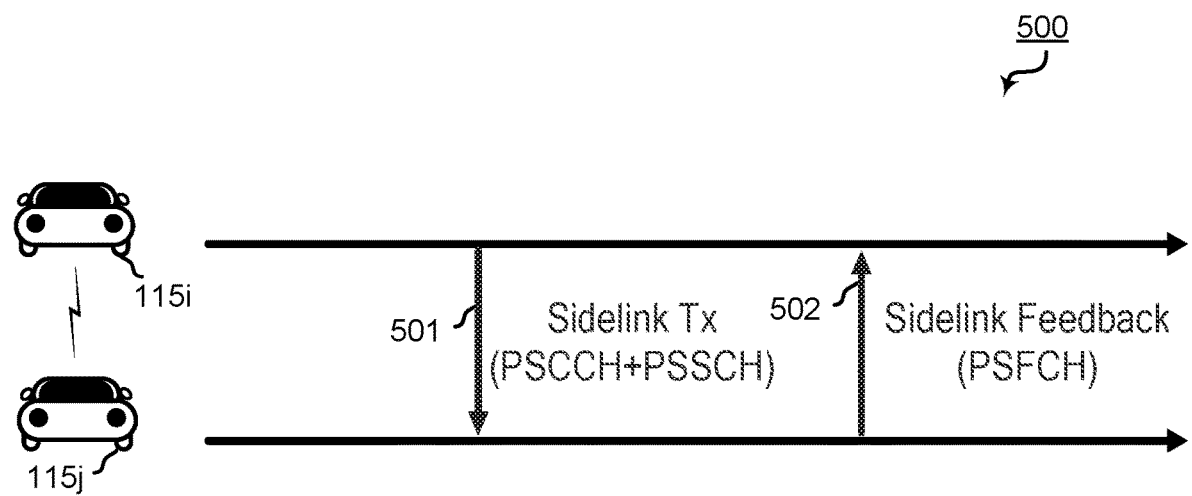
FIGS. 5A and 5B show an example of sidelink communication in accordance with a vehicle-to-everything (V2X) physical-layer procedure flow according to some embodiments of the present disclosure.
Figure 5B:
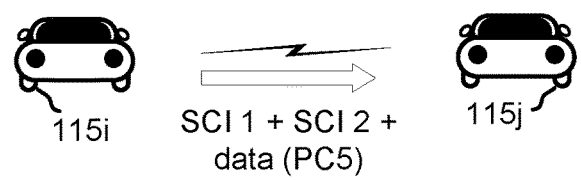
Figure 5C:
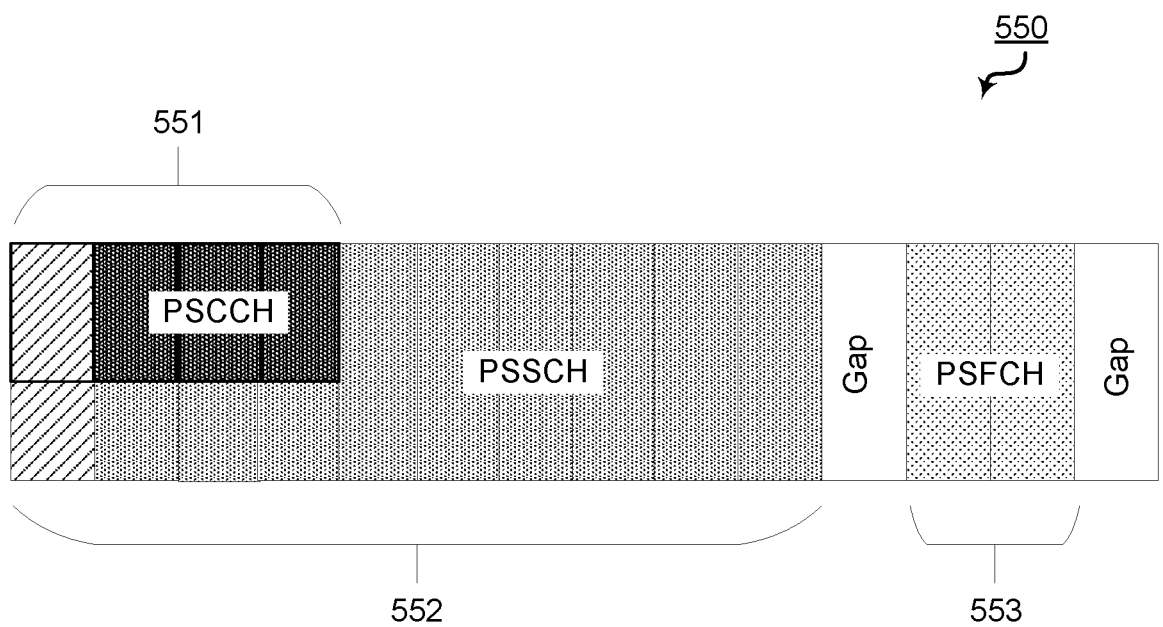
FIG. 5C shows a block diagram illustrating resource allocation of a sidelink communication subframe utilized in accordance with the V2X physical-layer procedure flow of FIGS. 5A and 5B.

FIGS. 5A-5C illustrate V2X Mode 2 operation according to some aspects of the disclosure. In particular, FIGS. 5A and 5B show an example of sidelink communication in accordance with a V2X physical-layer procedure flow. FIG. 5C shows a block diagram illustrating resource allocation of a sidelink communication subframe utilized in accordance with the example V2X physical-layer procedure.

Referring first to FIG. 5A, procedure flow 500 illustrates a physical-layer procedure flow using resources of sidelink resources configured by the network or preconfigured sidelink resources. Procedure flow 500 of FIG. 5A is described with reference to a V2X mesh network between UEs 115$i$ and 115$j$, either or both of which may also be in communication with one or more base stations (e.g., macro base station 105$e$, as shown in wireless network 100 of FIG. 1). It should be understood, however, that the procedure flow may be implemented with respect to various UEs and UE configurations (e.g., UEs 115$f$, 115$m$, and 115$n$ of FIG. 4).

In operation according to procedure flow 500 of FIG. 5A, UE 115$i$ (e.g., a sidelink TX UE) operating according to V2X Mode 2 operation may sense and select resources (e.g., time and frequency resources) for use in providing a sidelink with one or more sidelink RX UEs (e.g., UE 115$j$). For example, UE 115$i$ may sense and select resources based on all SCI format 0-1 (SCI 1) messages and the reference signal receive power (RSRP) measurements of a demodulation reference signal (DMRS) inside a PSSCH or a PSCCH.

At procedure 501 of procedure flow 500, UE 115$i$ (e.g., a sidelink TX UE) uses SCI, provided according to SCI 1 (e.g., for scheduling PSSCH and second-stage SCI format on PSSCH) and SCI format 0-2 (SCI 2) (e.g., for decoding PSSCH), to schedule PSSCH and transmit data (e.g., one or more transport blocks (TBs) comprising user data and/or other data) through PSSCH to UE 115$j$ (e.g., a sidelink RX UE) using the sidelink resources selected for the sidelink communications, as shown in FIG. 5B. For example, as shown in sidelink communication subframe 550 of the example of FIG. 5C, the one or more TBs may comprise time and frequency resources allocated for transmission of headers and control information (e.g., SCI 1 and SCI 2) of PSCCH 551 and time and frequency resources allocated for transmission of headers and payload data (e.g., application-layer payload and/or other UE data) of PSSCH 552.

According to aspects of the disclosure, SCI 1 provides fields for priority, frequency resource assignment, time resource assignment, resource reservation period, DMRS pattern, second-stage SCI format (broadcast, unicast, groupcast), Beta_offset indicator, number of DMRS port, modulation and coding scheme (MCS), and a reserved field. SCI 2 provides fields for hybrid automatic repeat request (HARQ) process identifier (ID), new data indicator, redundancy version, source ID, destination ID, and channel state indicator (CSI) request, also if the second-stage SCI format field in the corresponding SCI provided in SCI 1 indicates type 1 groupcast zone ID and communication range requirement fields are present.

At procedure 502 of procedure flow 500 of FIG. 5A, UE 115$j$ (e.g., a sidelink RX UE) receives the sidelink transmission and provides sidelink feedback to UE 115$i$ (e.g., a sidelink TX UE). For example, as shown in sidelink communication subframe 550 of the example of FIG. 5C, one or more TBs may comprise time and frequency resources allocated for transmission of feedback information (e.g., ACK and/or NACK) of physical sidelink feedback channel (PSFCH) 553. As noted above, three transmission types are specified in SCI 1: unicast; broadcast; and groupcast. For unicast or groupcast, each sidelink RX UE sends ACK/NACK on a PSFCH upon receiving each transmission, wherein there are two feedback options for groupcast: (i) NACK only; and (ii) ACK and NACK.

In the above description of FIGS. 5A and 5B, the UE scheduling resources for a sidelink is referred to as a sidelink TX UE in light of this UE establishing a sidelink with another UE and thus presumably being a UE to initially transmit sidelink communications. Correspondingly, the other UE in the example is referred to as a sidelink RX UE as presumably being a UE to initially receive sidelink communications. It should be appreciated, however, that either such UE may comprise a sidelink source UE transmitting communications to a sidelink destination UE and/or a sidelink destination UE receiving communications from sidelink source UE via the sidelink in accordance with aspects of the disclosure. For example, UE 115$f$ (e.g., a sidelink RX UE of the example of FIG. 4) may comprise a sidelink source UE transmitting temperature information to UE 115$n$ (e.g., the sidelink TX UE of the example of FIG. 4) comprising a sidelink destination UE of this example, such as in response to UE 115$n$ having transmitted a temperature report command to UE 115$f$, as part of an autonomous report by UE 115$f$, etc. In response, UE 115$n$ may provide sidelink feedback information to UE 115$f$ (e.g., ACK and/or NACK).

The subframe structure of sidelink communication subframe 550 of the example of FIG. 5C may be utilized with respect to either or both of a sidelink forward link (e.g., sidelink transmission from a sidelink TX UE to a sidelink RX UE) and a sidelink reverse link (e.g., sidelink transmission from a sidelink RX UE to a sidelink TX UE) according to some aspects of the disclosure. For example, UE 115$f$ (e.g., a sidelink RX UE of the example of FIG. 4) may transmit information to UE 115$n$ (e.g., the sidelink TX UE of the example of FIG. 4) via resource blocks (RBs) of a sidelink reverse link comprising time and frequency resources allocated for transmission of headers and control information (e.g., SCI 1 and SCI 2) of PSCCH 551 and time and frequency resources allocated for transmission of headers and payload data (e.g., application-layer payload and/or other UE data) of PSSCH 552. Correspondingly, UE 115$n$ (e.g., the sidelink TX UE) may transmit sidelink feedback to UE 115f (e.g., the sidelink RX UE) via RBs of a sidelink reverse link comprising time and frequency resources allocated for transmission of feedback information (e.g., ACK and/or NACK) of PSFCH 553.

Semi-persistent scheduling (SPS) may be implemented according to aspects of the present disclosure to facilitate the transmission of periodic messages via one or more sidelinks. For example, SPS may be utilized with respect to deterministic and periodic IIoT traffic of an industrial environment control network (e.g., industrial environment control network 400 of FIG. 4). In accordance with some aspects of the disclosure, implementation of SPS with respect to sidelinks may be configured to minimize overhead, such as due to various headers, with respect to this traffic.

In implementing SPS for a sidelink according to some aspects of the present disclosure a sidelink TX UE (e.g., UE 115n of industrial environment control network 400) may transmit SPS activation/deactivation to one or more sidelink RX UEs (e.g., UE 115f and/or 115m), such as through SCI 1 and/or SCI 2 messages of PSCCH (e.g., SCI 1 and SCI 2 of PSCCH 551) transmitted with the first PSSCH data (e.g., payload of PSSCH 552) of a sidelink implementing SPS. After activation, the sidelink TX UE (e.g., UE 115n) may omit transmission of SCI 1 and/or SCI 2 messages with respect to subsequently transmitted PSSCH data of the sidelink implementing SPS. For example, after activating SPS, subsequent instances of sidelink communication subframe 550 may comprise data-only traffic (e.g., payload data of PSSCH 552 unaccompanied by SCI of PSCCH 551 related to the payload data and/or upon which the payload data is dependent).

Control overhead is reduced with respect to the sidelink transmissions utilizing SPS according to some aspects of the disclosure. Such reduced control overhead may, for example, provide improved reliability with respect to the periodic sidelink data, such as through freeing bandwidth of the sidelink resources for more robust PSSCH data transmission. However, existing V2X protocols do not support omission of PSCCH, and thus sidelink communication subframes comprising a sidelink transmission utilizing SPS nevertheless include time and frequency resources allocated for PSCCH (e.g., PSCCH 551), even in instances where control information (e.g., SCI) corresponding to the payload data (e.g., SPS data-only traffic) is not present.

Aspects of the present disclosure enable and provide multiplexing of control information (e.g., SCI-only traffic) with separate or unassociated payload data (e.g., data-only traffic). In operation according to some implementations, control information (e.g., SCI-only traffic) of PSCCH 551 is unrelated to and/or independent of the use of, or allocation and/or assignment of resources for, the payload data (e.g., data-only traffic) of PSSCH 552 of a particular instance of sidelink communication subframe 550. For example, SCI-only traffic may comprise control information to be used by one or more UEs of a sidelink (e.g., to be utilized with respect to a second link direction, such as a sidelink reverse link) but which is not directly associated data traffic of a same sidelink communication subframe (e.g., an instance of subframe 550 used in communicating SCI-only traffic in a first sidelink direction, such as a sidelink forward link). Similarly, data-only traffic may comprise application-layer payload and/or other UE data which is not directly associated with control information of a same sidelink communication subframe (e.g., the instance of subframe 550 used in communicating data-only traffic in the first sidelink direction). That is, the control information of such SCI-only traffic and the sidelink traffic of such data-only traffic of a sidelink communication are decoupled (e.g., not directly associated), wherein this decoupled traffic is nevertheless introduced (e.g., multiplexed or otherwise included) in the same sidelink communication subframe for communication according to aspects of the disclosure.

Current PC5 interface protocols do not support closed-loop TPC with respect to UE sidelink communications. PC5 interface protocols provide for open-loop TPC sidelink operation for PSCCH/PSSCH and PSFCH in which a UE transmitting messages via a sidelink may autonomously implement power control without benefit of feedback of power control information from a corresponding UE receiving those messages via the sidelink. However, PC5 interface protocols do not provide for closed-loop TPC sidelink operation for PSCCH/PSSCH or PSFCH in which a UE transmitting message via a sidelink may implement power control based at least in part on power control information feedback from a corresponding UE receiving those messages via the sidelink. Operation according to aspects of the disclosure provide for multiplexing of TPC information (e.g., SCI-only traffic) and decoupled sidelink data traffic (e.g., data-only traffic) to enable and provide closed-loop TPC operation for PSCCH/PSSCH and/or PSFCH.

Multiplexing of TPC information and decoupled sidelink data traffic according to some aspects of the disclosure may, for example, provide closed-loop power control for IIoT SPS traffic to enable more effective power and interference management than may be achieved using open-loop power control. For example, an industrial controller (e.g., PLC configuration of UE 115n of industrial environment control network 400) which receives messages from multiple S/As (e.g., thermometer configuration of UE 115f and robotic actuator configuration of UE 115m of industrial environment control network 400) may use a SCI-based TPC message of some aspects of the disclosure multiplexed with sidelink SPS traffic (e.g., transmitted via PSCCH/PSSCH of a first sidelink direction, such as a sidelink forward link) to adjust the transmit power of one or more of the S/As (e.g., PSFCH of the first sidelink direction, such as the sidelink forward link, and/or PSCCH/PSSCH of a second sidelink direction, such as a sidelink reverse link), such as to reduce interference and/or facilitate high reliability. In operation according to an example, it may be desirable to lower the transmit power of one or more channels (e.g., PSCCH/PSSCH and/or PSFCH) transmitted by UE 115f, whereby UE 115n may provide TPC information to UE 115f using SCI-only traffic of a SCI-based TPC message communicated in an instance of sidelink communication subframe 550 with data-only traffic of a sidelink SPS message to reduce the interference to UE 115m. In operation according to another example, it may be desirable to increase the transmit power of one or more channels (e.g., PSSCH/PSSCH and/or PSFCH) transmitted by UE 115f and/or 115m, whereby UE 115n may provide TPC information to UE 115f and/or UE 115m using SCI-only traffic of a SCI-based TPC message communicated in an instance of sidelink communication subframe 550 with data-only traffic of a sidelink SPS message to improve the received SINR with respect to the signals transmitted by UE 115f and/or 115m. Additionally or alternatively, a S/A (e.g., UE 115f and/or 115m) provide TPC information to an industrial controller (e.g., PLC configuration of UE 115n) in a similar manner to that described above (e.g., transmitted via PSCCH/PSSCH of a second sidelink direction, such as a sidelink reverse link, to provide closed-loop power control with respect to PSFCH of the second sidelink direction, such as the sidelink reverse link, and/or PSCCH/PSSCH of a first sidelink direction, such as a sidelink forward link).

TPC information provided according to some aspects of the disclosure comprises one or more TPC indicators and corresponding one or more TPC messages. A TPC indicator of an example implementation may be introduced into a SCI 1 message and/or a SCI 2 message (e.g., SCI 1 message and/or SCI 2 message of SCI-only traffic). Correspondingly, a TPC message providing TPC command information may be introduced into a SCI 1 message and/or a SCI 2 message (e.g., SCI 1 message and/or SCI 2 message of SCI-only traffic). The TPC indicator may, for example, indicate that the SCI includes a TPC message and/or that the SCI of the sidelink communication in which the TPC information is transmitted and the sidelink traffic of that sidelink communication are decoupled. The TPC indicator may prevent a decoding error from being declared by a decoding UE that receives the SCI. For example, the TPC indicator may be used by the decoding UE to identify that the SCI contains the TPC message and that the SCI is not of a different format or configuration that does not include a TPC message and/or TPC command.

A TPC indicator may be introduced into SCI of a sidelink communication (e.g., SCI of PSCCH 551) using various techniques, whether alone or in combination. For example, a TPC indicator may be introduced in a SCI 1 message or a SCI 2 message by scrambling a cyclic redundancy check (CRC) of the SCI 1 message or the SCI 2 message using a TPC radio network temporary identifier (RNTI). For example, a sidelink TX UE may define or otherwise provide a TPC-PSCCH-RNTI/TPC-PSSCH-RNTI for use with respect to PSCCH/PSSCH TPC and/or a TPC-PSFCH-RNTI for use with respect to PSFCH TPC. Additionally or alternatively, a TPC indicator may be an implicit indication introduced in a SCI 1 message or a SCI 2 message by using a SCI 1 configuration or a SCI 2 configuration defined for TPC information. For example, a configuration or format of SCI 1 and/or SCI 2 exclusively for use with respect to TPC may be defined such that use of this SCI configuration provides a TPC indicator. In other words, the TPC indicator may be indicated by a format or configuration of SCI (e.g., a format of the SCI 1 message and/or the SCI 2 message). Additionally, or alternatively, when the TPC indicator is an implicit indication, the TPC indicator may not include any explicit TPC indicator bits to indicate the SCI includes the TPC message and/or that the SCI of the sidelink communication in which the TPC information is transmitted and the sidelink traffic of that sidelink communication are decoupled.

Further, a TPC indicator may additionally or alternatively be introduced in a SCI 1 message or a SCI 2 message as an explicit indication by setting one or more bits in SCI 1 or SCI 2 reserved for TPC indication. For example, an explicit bit or bits may be defined or otherwise allocated in SCI 1 or SCI 2 for indicating that the corresponding SCIs contain TPC information. Additionally or alternatively, a TPC indicator may be introduced in a SCI 1 message or a SCI 2 message as an explicit indication by using one or more bits of SCI 1 or SCI 2 available and/or designated for purposes other than TPC indication. For example, one or more bits (e.g., "SCI Format" field in SCI 1) defined or otherwise allocated in SCI 1 or SCI 2 for use with respect to purposes other than TPC may be used for explicitly indicating that the corresponding SCIs contain TPC information.

A TPC indicator according to some aspects of the disclosure may provide information in addition to indicating that the SCI includes one or more TPC messages. For example, a TPC indicator of some examples may include one or more bits indicating whether TPC commands target PSCCH/PSSCH, target the PSFCH, or a combination thereof.

A TPC message may be introduced into SCI of a sidelink communication (e.g., SCI of PSCCH 551) using various techniques. For example, one or more fields may be defined within SCI 1 and/or SCI 2 for TPC messages. A configuration of SCI 1 and/or SCI 2 exclusively for use with respect to TPC may be defined to include one or more TPC message fields configured to carry one or more blocks for TPC control. Additionally or alternatively, a TPC message may be introduced in a SCI 1 message or a SCI 2 message by using one or more fields of SCI 1 or SCI 2 available for purposes other than TPC indication. For example, one or more bits (e.g., "HARQ ID" field in SCI 2) defined or otherwise allocated in SCI 1 or SCI 2 for use with respect to purposes other than TPC may be used for carrying TPC messages.

A TPC message providing TPC command information with respect to one or more sidelinks may comprise a plurality of blocks, wherein the blocks comprise TPC command information with respect to signal transmission via one or more sidelink channels (e.g., PSCCH/PSSCH and/or PSFCH) by one or more UEs. The TPC command information of some examples may provide for power control with respect to one or more channels (e.g., PSCCH/PSSCH and/or PSFCH), such as by providing a transmit power level to be implemented, an adjustment to a power level, an amount of transmit power increase to be implemented, an amount of transmit power decrease to be implemented, etc. In accordance with some aspects of the disclosure, TPC command information may directly comprise TPC commands (e.g., blocks of a TPC message may comprise explicit power control commands) or indirectly reference TPC commands (e.g., blocks of a TPC message may comprise information referencing a database or other source of separately stored TPC commands).

In accordance with some aspects of the disclosure, a TPC message may comprise N blocks each comprising TPC command information for a PSCCH/PSSCH and/or PSFCH transmission. Each block of the TPC message may, for example, provide a fixed number of TPC command information bits. A mapping between the TPC command information and the power adjustment to be carried out by the transmitter may be provided in an implementation where the TPC command information indirectly references TPC commands. For example, each TPC message block may comprise 2 TPC command information bits where a preconfigured table is used for translating the 2 bits into a power adjustment (a transmit power level to be implemented, an amount of transmit power increase to be implemented, an amount of transmit power decrease to be implemented, etc.).

The blocks of a TPC message may be indexed (e.g. N blocks having indices 1, 2, . . . , N) to provide correspondence between a respective TPC command and PSCCH/PSSCH and/or PSFCH transmission. A mapping between a block index and a corresponding PSCCH/PSSCH and/or PSFCH transmission may be utilized to indicate correspondence between the TPC control information and respective channel transmission. For example, one or more parameters (e.g., tpc-PSCCH/tpc-PSSCH and/or tpc-PSFCH) may be provided to establish the mapping between the TPC message blocks and respective channel transmission. In accordance with some aspects of the disclosure, multiple instances of PSCCH/PSSCH and/or PSFCH may be mapped to the same block index of a TPC message (e.g., where the multiple channels experience similar fading behavior). A TPC message may include a source ID or otherwise have a source ID attached thereto, such as for use in designating a particular mapping where the mapping between the TPC message blocks and respective channel transmissions depends on the source ID (e.g., in an implementation in which the source ID is not derived from the TPC indicator). Additionally or alternatively, blocks of a TPC message may include a source ID and/or a destination ID that specify the sidelink which the TPC command bits act on. For example, if a sidelink source UE wants to provide a TPC command through a sidelink to a sidelink destination UE that is providing PSCCH/PSSCH and/or PSFCH transmission corresponding to block index N=1, the corresponding source ID and/or destination ID may be included in the N=1 block of the TPC message.

Various aspects of TPC messages may be preconfigured or otherwise mutually established for use in implementing multiplexing of TPC information and decoupled sidelink data traffic according to aspects of the present disclosure. For example, aspects of TPC messages, such as a number of blocks (N) of a TPC message, mapping between a block index and PSCCH/PSSCH and/or PSFCH, mapping between the TPC command bits and the power adjustment carried out by the transmitter, etc., may be preconfigured prior to transmission of TPC information and/or prior to initiating an associated sidelink (e.g., when a UE joins a respective network, such as an industrial environment control network, when SPS or other operation providing for data-only communication is configured, etc.). In accordance with some examples, some or all of the aspects of TPC messages may be preconfigured by a layer higher than the physical-layer implementing the multiplexing of TPC information and decoupled sidelink data traffic (e.g., a control layer implemented by control logic, such as sidelink control logic, executing in a processor of a base station providing network control with respect to an industrial environment control network, a control layer implemented by control logic, such as sidelink control logic, executed in a processor of a UE communicating via a sidelink of an industrial environment control network, etc.).

Figures 6, 7:
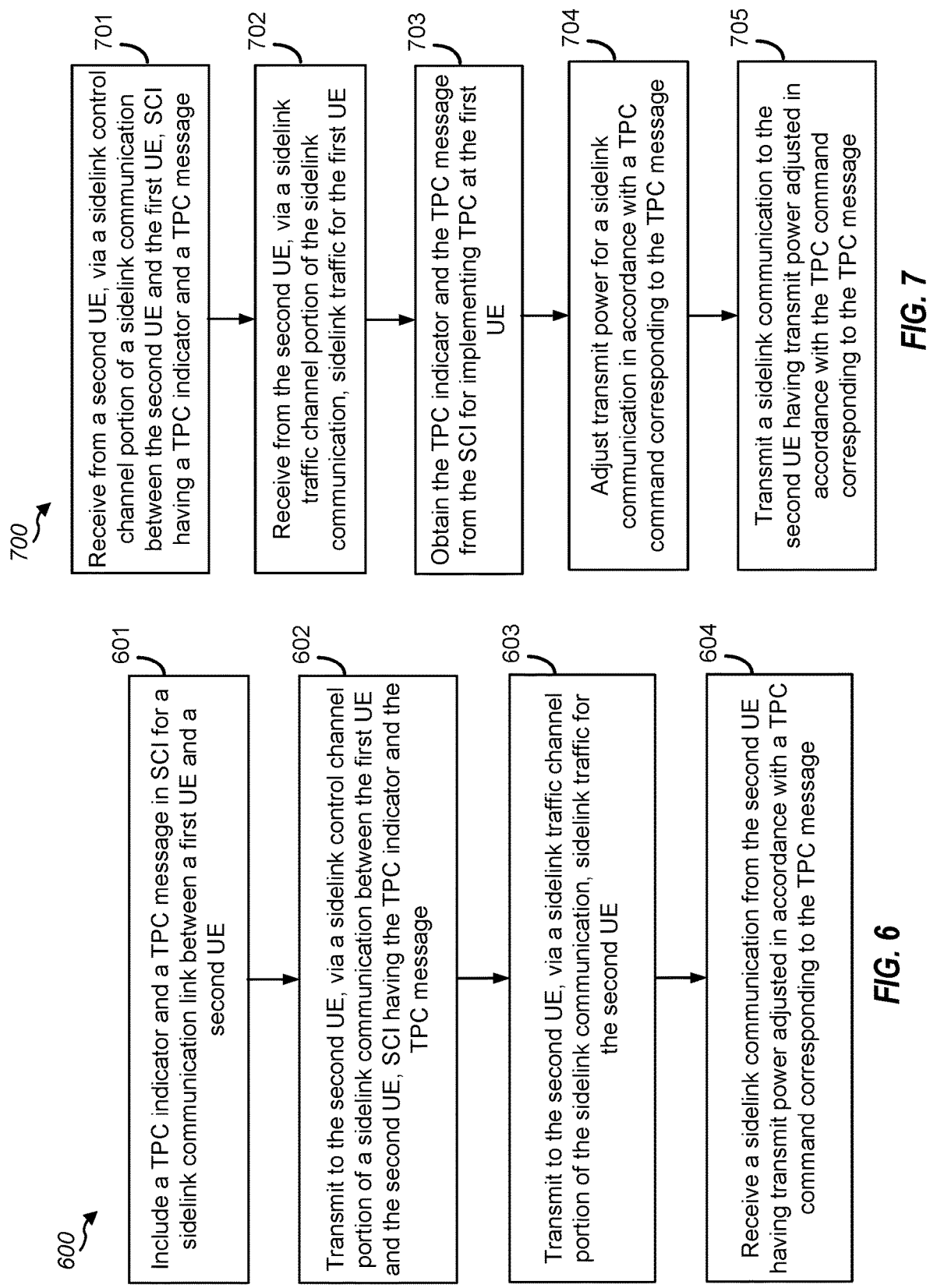
FIG. 6 is a flow diagram illustrating an example process that supports multiplexing of transmit power control (TPC) information and decoupled sidelink data traffic according to one or more aspects.
FIG. 7 is a flow diagram illustrating an example process that supports multiplexed TPC information and decoupled sidelink data traffic according to one or more aspects.

FIG. 6 is a flow diagram illustrating an example process 600 that supports multiplexing of TPC information and decoupled sidelink data traffic according to one or more aspects. Operations of process 600 may be performed by a UE, such as UE 115 described above with reference to FIGS. 1 and 2 or a UE described with reference to FIG. 8, operating as source UE with respect to a sidelink communication in which closed-loop TPC information is communicated (e.g., transmitted by the source UE to a destination UE). For example, operations (also referred to as "blocks") of process 600 may enable UE 115 to support multiplexing of TPC information and decoupled sidelink data traffic according to aspects of the disclosure.

At block 601 of process 600 of the example shown in FIG. 6, the UE (e.g., a first or sidelink source UE for a sidelink communication in which closed-loop TPC information is communicated) may include a TPC indicator and a TPC message in SCI for a sidelink communication link between the first UE and a second UE (e.g., a destination UE for the sidelink). The TPC indicator and TPC message may, for example, comprise TPC information of SCI-only traffic of some aspects. TPC control logic (e.g., processor executable code stored in memory 282) executed in a processor (e.g., a processor of controller 280) of the first UE may monitor one or more aspects of signals received from the second UE and determine that closed-loop power control is to be implemented with respect to the transmissions by the UE (e.g., to lower the second UE transmit power to reduce interference to other UEs or to increase the second UE transmit power to improve the received SINR). TPC logic of the first UE may monitor one or more aspects of network communications (e.g., receive signal strength, SINR, BLER, path loss, channel conditions, fading behavior, etc.) to determine one or more TPC command for implementing with respect to the transmitter of the second UE. Power control information for implementing the closed-loop power control may be carried by the TPC message in the SCI (e.g., SCI 1 message and/or SCI 2 message of SCI-only traffic). The TPC indicator may be included in the SCI (e.g., SCI 1 message and/or SCI 2 message of SCI-only traffic) to indicate that the SCI includes the TPC message and/or that the SCI and the sidelink traffic of the sidelink communication are decoupled.

TPC control logic of some examples may include a TPC indicator in SCI for a sidelink communication link according to various techniques. For example, TPC control logic may include the TPC indicator in a SCI 1 message and/or a SCI 2 message of the SCI by performing one or more of scrambling a CRC of the SCI 1 message or the SCI 2 message using a TPC RNTI, using a SCI 1 configuration or a SCI 2 configuration defined for TPC command information, setting one or more bits in SCI 1 or SCI 2 reserved for TPC indication, or using one or more bits of SCI 1 or SCI 2 available for purposes other than TPC indication. In accordance with some aspects of the disclosure, the TPC indicator may include one or more bits indicating whether the TPC command information targets a PSCCH/PSSCH or targets a PSFCH.

Additionally or alternatively, TPC control logic of some examples may include a TPC message in SCI for a sidelink communication link according to various techniques. For example, TPC control logic may provide bits of a TPC message in one or more fields defined within SCI 1 and/or SCI 2 for TPC messages and/or in one or more fields of SCI 1 or SCI 2 available for purposes other than TPC indication. In accordance with some aspects of the disclosure, a TPC message may be included in SCI in a plurality of blocks each having a block index and each comprising respective TPC command information, wherein the block index of each block of the plurality of blocks provides a mapping between the block and a corresponding PSCCH/PSSCH and/or a corresponding PSFCH. The TPC command information of each block may, for example, comprise one or more TPC command bits mapped to a corresponding power adjustment for carrying out with respect to the corresponding PSCCH/PSSCH and/or the corresponding PSFCH. In some examples, each block of the TPC message blocks includes at least one of a source ID or a destination ID specifying the sidelink to which a TPC command corresponding to the respective TPC command information applies.

Information regarding the TPC indicator, TPC message, TPC command information, and/or TPC commands may be stored (e.g., in a TPC database in memory 282) by the first and/or second UE. For example, the particular bits of a TPC indicator for indicating whether the TPC command information targets a PSCCH/PSSCH or targets a PSFCH, TPC RNTI for scrambling CRC of SCI messages, SCI configuration information for TPC, particular bits reserved for TPC indication, one or more bits of SCI available for purposes other than TPC indication to be used for TPC indication, one or more fields defined within SCI to be used for TPC messages, one or more fields of SCI available for purposes other than TPC indication to be used for TPC indication, the block index of each TPC message block, mapping between TPC message blocks and corresponding channels, mapping between TPC command information and corresponding power adjustment, etc. may be stored in a TPC database for use by TPC logic in accordance with some aspects of the disclosure.

At block 602 of process 600 of the illustrated example, the first UE may transmit to the second UE, via a sidelink control channel portion of the sidelink communication between the first UE and the second UE, SCI having the TPC indicator and the TPC message. For example, sidelink control logic and/or TPC control logic of a sidelink source UE may utilize wireless communication resources (e.g., one or more wireless radios, such as may comprise transmit processor 264, TX MIMO processor 266, and MODs/DE-MODs 254a through 254r, operating under control of one or more controllers, such as controller 280) to transmit the TPC indicator and TPC message included in SCI for the sidelink communication link. The sidelink control channel portion of the sidelink communication may comprise one or more PSCCH messages according to some examples of the disclosure.

At block 603 of process 600 of the illustrated example, the first UE may transmit to the second UE, via a sidelink traffic channel portion of the sidelink communication between the first UE and the second UE, sidelink traffic for the second UE. For example, sidelink control logic and/or TPC control logic of a sidelink source UE may utilize wireless communication resources (e.g., one or more wireless radios, such as may comprise transmit processor 264, TX MIMO processor 266, and MODs/DEMODs 254a through 254r, operating under control of one or more controllers, such as controller 280) to transmit the sidelink traffic for the sidelink communication link. The sidelink traffic channel portion of the sidelink communication may comprise one or more PSSCH messages according to some examples of the disclosure. If the sidelink data is absent, the first UE may pad (e.g., insert null information, such as all 0s or all 1s) the unused RBs allocated for PSSCH. Additionally or alternatively, a no-data indicator may be sent in SCI 1 or SCI 2 according to some examples, such as to avoid the sidelink destination UE reporting a decoding error due to absence of data.

In operation according to blocks 602 and 603 of examples, the first UE transmits SCI (e.g., SCI 1 and SCI 2 messages) that contains the TPC indicator and the TPC contents together with a sidelink traffic transmission. The SCI comprising the TPC indicator and TPC message is multiplexed in a same sidelink communication (e.g., a same sidelink communication subframe) as sidelink traffic that is not directly associated with the SCI messages. The sidelink traffic may, for example, comprise data-only traffic (e.g. SPS data-only traffic) of some aspects. Accordingly, the SCI of the sidelink communication and the sidelink traffic of the sidelink communication of some examples are decoupled.

At block 604 of flow 600 of the illustrated example, the first UE may receive a sidelink communication from the second UE having transmit power adjusted in accordance with a TPC command corresponding to the TPC message. For example, sidelink control logic and/or TPC control logic (e.g., processor executable code stored in memory 282) executed in a processor (e.g., a processor of controller 280) of a sidelink source UE may utilize wireless communication resources (e.g., one or more wireless radios, such as may comprise MODs/DEMODs 254a through 254r, MIMO detector 256, and receive processor 258, operating under control of one or more controllers, such as controller 280) to receive the sidelink communication from the second UE having transmit power adjusted in accordance with a TPC command corresponding to the TPC message included in SCI for the sidelink communication link. The TPC message may directly comprise one or more TPC commands and/or indirectly reference one or more TPC commands for controlling transmit power of sidelink transmission(s) made by the second UE. TPC commands of some examples may provide for power control with respect to one or more channels (e.g., PSCCH/PSSCH and/or PSFCH) of a sidelink communication link between the first and second UE, such as by providing a transmit power level to be implemented, an adjustment to a power level, an amount of transmit power increase to be implemented, an amount of transmit power decrease to be implemented, etc. Accordingly, the first UE may receive one or more channels of a sidelink communication link between the first and second UE having transmit power adjusted in accordance with one or more TPC commands corresponding to the TPC message transmitted by the first UE.

As should be appreciated from the foregoing, operation in accordance with flow 600 of examples enables and provides closed-loop TPC for UE sidelink communications, wherein TPC information may be provided by the first UE to the second UE with respect to sidelink communications transmitted by the second UE to the first UE. In accordance with some aspects of the disclosure, TPC information communication techniques according to flow 600 may, for example, facilitate closed-loop TPC with respect to sidelink communication using an interface, such as a V2V or V2X interface, that does not directly support closed-loop TPC. Operation in accordance with flow 600 of some implementations may facilitate improved communications, including controlling adjustment of sidelink transmit power to reduce interference and/or increase reliability. For example, the first UE may comprise an industrial controller which receives messages from multiple UEs, including the second UE, that comprise S/As and may communicate TPC information to adjust the transmit power of one or more S/A, such as to lower the S/A transmit power to reduce interference to other S/As or to increase the S/A transmit power to improve the received SINR (e.g., increase reliability). As a further example, the first UE may comprise a S/A which receives messages from the second UE comprising an industrial controller and may communicate TPC information to adjust the transmit power of the industrial controller, such as to lower the industrial controller transmit power to reduce interference or to increase the industrial controller transmit power to improve the received SINR.

FIG. 7 is a flow diagram illustrating an example process 700 that supports multiplexed TPC information and decoupled sidelink data traffic according to one or more aspects. Operations of process 700 may be performed by a UE, such as UE 115 described above with reference to FIGS. 1 and 2 or a UE described with reference to FIG. 8, operating as destination UE with respect to a sidelink communication in which closed-loop TPC information is communicated (e.g., received by the destination UE from a source UE). For example, operations (also referred to as "blocks") of process 700 may enable UE 115 to support multiplexed TPC information and decoupled sidelink data traffic according to aspects of the disclosure.

At block 701 of process 700 of the example shown in FIG. 7, the UE (e.g., a second or sidelink destination UE for a sidelink communication in which closed-loop TPC information is communicated) may receive from a first UE, via a sidelink control channel portion of the sidelink communication between the first UE and the second UE, SCI having a TPC indicator and a TPC message. For example, sidelink control logic and/or TPC control logic (e.g., processor executable code stored in memory 282) executed in a processor (e.g., a processor of controller 280) of a sidelink destination UE may utilize wireless communication resources (e.g., one or more wireless radios, such as may comprise MODs/DEMODs 254*a* through 254*r*, MIMO detector 256, and receive processor 258, operating under control of one or more controllers, such as controller 280) to receive the TPC indicator and TPC message included in SCI for the sidelink communication link. The sidelink control channel portion of the sidelink communication may comprise one or more PSCCH messages according to some examples of the disclosure.

The TPC indicator and TPC message may, for example, comprise TPC information of SCI-only traffic of some aspects. The TPC indicator may be included in the SCI (e.g., SCI 1 message and/or SCI 2 message of SCI-only traffic) to indicate that the SCI includes the TPC message and/or that the SCI and the sidelink traffic of the sidelink communication are decoupled. The TPC message may be included in the SCI (e.g., SCI 1 message and/or SCI 2 message of SCI-only traffic) to provide power control information for implementing closed-loop power control.

At block 702 of process 700 of the illustrated example, the second UE may receive from the first UE, via a sidelink traffic channel portion of the sidelink communication between the first UE and the second UE, sidelink traffic for the second UE. For example, sidelink control logic and/or TPC control logic of a sidelink destination UE may utilize wireless communication resources (e.g., one or more wireless radios, such as may comprise MODs/DEMODs 254*a* through 254*r*, MIMO detector 256, and receive processor 258, operating under control of one or more controllers, such as controller 280) to receive the sidelink traffic for the sidelink communication link. The sidelink traffic channel portion of the sidelink communication may comprise one or more PSSCH messages according to some examples of the disclosure.

The sidelink traffic may, for example, comprise data-only traffic (e.g. SPS data-only traffic) of some aspects. Accordingly, the SCI of the sidelink communication and the sidelink traffic of the sidelink communication of some examples are decoupled. If sidelink data is absent, the sidelink traffic channel portion of the sidelink communication may include null information (e.g., all 0s or all 1s) in the unused RBs allocated for PSSCH. Additionally or alternatively, a no-data indicator may be received in SCI 1 or SCI 2 according to some examples, such as to avoid the second UE (e.g., sidelink destination UEs) reporting a decoding error due to absence of data.

At block 703 of process 700 of the illustrated example, TPC control logic of the second UE may obtain the TPC indicator and the TPC message from the SCI for implementing TPC at the second UE. For example, TPC control logic of the second UE may monitor one or more aspects of signals received from the first UE and determine that TPC information for implementing closed-loop power control is being communicated in the SCI (e.g., SCI 1 message and/or SCI 2 message of SCI-only traffic). The TPC indicator may, for example, be included in the SCI (e.g., SCI 1 message and/or SCI 2 message of SCI-only traffic) to indicate that the SCI includes the TPC message and/or that the SCI and the sidelink traffic of the sidelink communication are decoupled.

TPC control logic of a sidelink destination UE of some examples may obtain a TPC indicator from SCI for a sidelink communication link according to various techniques. TPC control logic may, for example, obtain the TPC indicator from a SCI 1 message and/or a SCI 2 message of the SCI by performing one or more of descrambling a CRC of the SCI 1 message or the SCI 2 message using a TPC RNTI, identifying use of a SCI 1 configuration or a SCI 2 configuration defined for TPC command information, detecting one or more bits in SCI 1 or SCI 2 reserved for TPC indication, or detecting one or more bits of SCI 1 or SCI 2 available for purposes other than TPC indication being used for TPC indication. In accordance with some aspects of the disclosure, obtaining the TPC indicator may include obtaining information regarding whether the TPC command information targets a PSCCH/PSSCH or targets a PSFCH, such as by detecting one or more bits indicating a target of the TPC command information.

Additionally or alternatively, TPC control logic of some examples may obtain a TPC message from SCI for a sidelink communication link according to various techniques. For example, TPC control logic may detect bits of a TPC message in one or more fields defined within SCI 1 and/or SCI 2 for TPC messages and/or in one or more fields of SCI 1 or SCI 2 available for purposes other than TPC indication being used for TPC messages. In accordance with some aspects of the disclosure, a TPC message may be obtained from SCI from a plurality of blocks each having a block index and each comprising respective TPC command information, wherein the block index of each block of the plurality of blocks provides a mapping between the block and a corresponding PSCCH/PSSCH and/or a corresponding PSFCH. The TPC command information of each block may, for example, comprise one or more TPC command bits mapped to a corresponding power adjustment for carrying out with respect to the corresponding PSCCH/PSSCH and/or the corresponding PSFCH. In some examples, at least one of a source ID or a destination ID specifying the sidelink to which a TPC command corresponding to the respective TPC command information applies may be obtained from each block of the TPC message blocks.

At block 704 of process 700 of the illustrated example, the second UE may adjust transmit power for a sidelink communication in accordance with a TPC command corresponding to the TPC message. For example, TPC control logic of the second UE may utilize the obtained TPC message to access or otherwise acquire one or more TPC commands and adjust transmit power for a sidelink communication in accordance with the one or more TPC commands. The TPC message may directly comprise one or more TPC commands and/or indirectly reference one or more TPC commands for controlling transmit power of sidelink transmission(s) made by the second UE. TPC commands of some examples may provide for power control with respect to one or more channels (e.g., PSCCH/PSSCH and/or PSFCH) of a sidelink communication link between the first and second UE, such as by providing a transmit power level to be implemented, an adjustment to a power level, an amount of transmit power increase to be implemented, an amount of transmit power decrease to be implemented, etc. Accordingly, the second UE may control transmit power with respect to one or more channels of a sidelink communication link between the first and second UE to adjust transmit power in accordance with one or more TPC commands corresponding to the TPC message received from the first UE.

At block 705 of process 700 of the illustrated example, the second UE may transmit a sidelink communication to the first UE having transmit power adjusted in accordance with the TPC command corresponding to the TPC message. For example, sidelink control logic and/or TPC control logic of a sidelink destination UE may utilize wireless communication resources (e.g., one or more wireless radios, such as may comprise transmit processor 264, TX MIMO processor 266, and MODs/DEMODs 254a through 254r, operating under control of one or more controllers, such as controller 280) to transmit the sidelink communication to sidelink source UE having transmit power adjusted in accordance with a TPC command corresponding to the TPC message included in SCI for the sidelink communication link. Accordingly, the second UE may transmit one or more channels of a sidelink communication link between the first and second UE using transmit power adjusted in accordance with one or more TPC commands corresponding to the TPC message received from the first UE.

As should be appreciated from the foregoing, operation in accordance with flow 700 of examples enables and provides closed-loop TPC for UE sidelink communications, wherein TPC information may be received by the second UE from the first UE with respect to sidelink communications transmitted by the second UE to the first UE. In accordance with some aspects of the disclosure, TPC information communication techniques according to flow 700 of some aspects may, for example, facilitate closed-loop TPC with respect to sidelink communication using an interface, such as a V2V or V2X interface, that does not directly support closed-loop TPC. Operation in accordance with flow 700 of some implementations may facilitate improved communications, including controlling adjustment of sidelink transmit power to reduce interference and/or increase reliability. For example, the second UE may comprise a S/A of multiple S/As transmitting messages to the first UE that may comprise an industrial controller and may receive TPC information communicated to the SAs to adjust the transmit power of one or more S/A, such as to lower the S/A transmit power to reduce interference to other S/As or to increase the S/A transmit power to improve the received SINR (e.g., increase reliability). As a further example, the second UE may comprise an industrial controller that transmits messages to the second UE that may comprise a S/A and may receive TPC information communicated to adjust the transmit power of the industrial controller, such as to lower the industrial controller transmit power to reduce interference or to increase the industrial controller transmit power to improve the received SINR.

Figure 8:
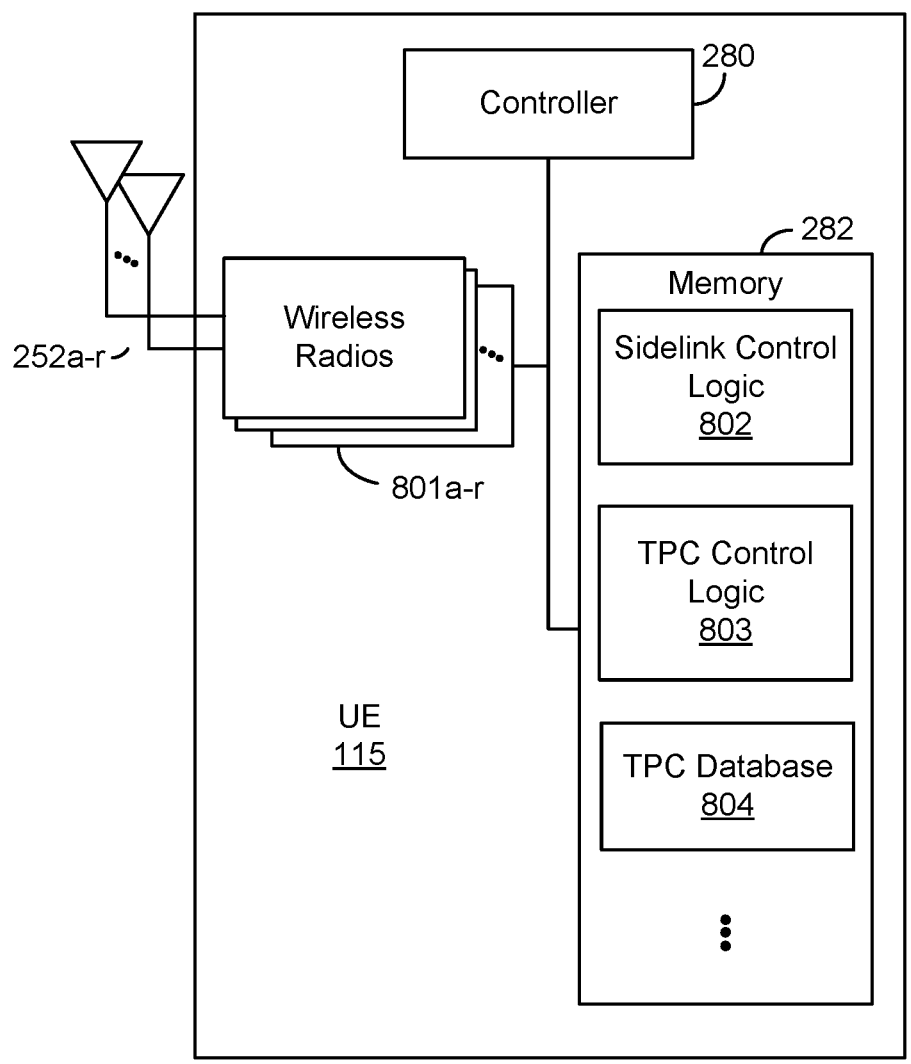
FIG. 8 is a block diagram of an example UE that supports TPC information and decoupled sidelink data traffic according to one or more aspects.

FIG. 8 is a block diagram of an example of UE 115 that supports multiplexing of TPC information and decoupled sidelink data traffic according to one or more aspects. UE 115 may be configured to perform operations, including the blocks of a process described with reference to FIGS. 6 and 7. In some implementations, UE 115 includes the structure, hardware, and components shown and described with reference to UE 115 of FIGS. 1 and 2. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 801a-r and antennas 252a-r. Wireless radios 801a-r include various components and hardware, as illustrated in FIG. 2 for UE 115, including modulator and demodulators 254a-r, MIMO detector 256, receive processor 258, transmit processor 264, and TX MIMO processor 266.

As shown, memory 282 may include sidelink control logic 802, TPC control logic 803, and TPC database 804. Sidelink control logic 802 may be configured to control, or assist in controlling, various aspects of sidelink communications, such as sidelink resource allocation, establishing sidelinks, communication of sidelink messages, etc. In accordance with some examples, sidelink control logic may be configured to preconfigure or otherwise establish various aspects of TPC messages for use in implementing multiplexing of TPC information and decoupled sidelink data traffic according to aspects of the present disclosure, such as a number of blocks (N) of a TPC message, mapping between a block index and PSCCH/PSSCH and/or PSFCH, mapping between the TPC command bits and the power adjustment carried out by the transmitter, etc. TPC control logic 803 may be configured to control, or assist in controlling, various aspects of TPC (e.g., closed-loop TPC) with respect to sidelink communications, such as monitor one or more aspects of signals received from a UE and determine that closed-loop power control is to be implemented with respect to the transmissions by the UE, include TPC information (e.g., a TPC indicator and a TPC message) in SCI for a sidelink communication link, multiplex TPC information in a same sidelink communication as sidelink traffic that is not directly associated with the SCI messages, communication of the TPC information and sidelink traffic, obtaining the TPC information, implementing TPC in accordance with a TPC command obtained from or based on the TPC information, etc. TPC database 804 may comprise various information facilitating or used with respect to TPC of aspects of the disclosure, such as the particular bits of a TPC indicator for indicating whether the TPC command information targets a PSCCH/PSSCH or targets a PSFCH, TPC RNTI for scrambling CRC of SCI messages, SCI configuration information for TPC, particular bits reserved for TPC indication, one or more bits of SCI available for purposes other than TPC indication to be used for TPC indication, one or more fields defined within SCI to be used for TPC messages, one or more fields of SCI available for purposes other than TPC indication to be used for TPC indication, the block index of each TPC message block, mapping between TPC message blocks and corresponding channels, mapping between TPC command information and corresponding power adjustment, etc. may be stored in a TPC database for use by TPC logic in accordance with some aspects of the disclosure. UE 115 may receive signals from or transmit signals to one or more network entities, such as another UE 115 and/or base station 105 of FIGS. 1, 2 and 4.

It should be appreciated that, although examples have been described above with reference to multiplexing of TPC information and decoupled SPS sidelink data-only traffic, TPC information may be multiplexed with various sidelink traffic according to concepts of the disclosure. For example, TPC information of some aspects of the disclosure may be multiplexed with any data-only sidelink traffic, such as SCI-scheduled data-only sidelink transmissions.

In some examples of methods, apparatuses, and articles described herein, various aspects of TPC information and sidelink data traffic multiplexing techniques may be implemented according to a multiplicity of combinations consistent with concepts described herein. Non-limiting examples of combinations of some aspects of SPS for sidelink groupcast techniques are set forth in the example clauses below.

1. Methods, apparatuses, and articles for wireless communication may provide for transmitting, by a first UE to a second UE via a sidelink control channel portion of a sidelink communication between the first UE and the second UE, SCI that includes a transmit power control (TPC) indicator and a TPC message, and transmitting, by the first UE to the second UE via a sidelink traffic channel portion of the sidelink communication, sidelink traffic for the second UE.

2. The methods, apparatuses, and articles of clause 1, wherein the TPC indicator indicates that the SCI includes the TPC message.

3. The methods, apparatuses, and articles of clause 2, wherein the TPC indicator indicates that the SCI includes the TPC message based at least in part on one or more of a CRC of a SCI 1 message or a SCI 2 message scrambled using a TPC RNTI, a SCI 1 configuration or a SCI 2 configuration defined for TPC command information, one or more bits in SCI 1 or SCI 2 reserved for TPC indication, or one or more bits of SCI 1 or SCI 2 available for purposes other than TPC indication.

4. The methods, apparatuses, and articles of any of clauses 1-3, wherein the TPC message includes TPC command information with respect to a sidelink control channel and a sidelink traffic channel for a sidelink or a feedback channel for the sidelink, and wherein the SCI of the sidelink communication and the sidelink traffic of the sidelink communication are decoupled.

5. The methods, apparatuses, and articles of any of clauses 1-4, wherein the sidelink traffic comprises SPS transmission of data unaccompanied by resource scheduling information for the data transmission in the SCI.

6. The methods, apparatuses, and articles of any of clauses 1-5, wherein the TPC indicator includes one or more bits indicating whether the TPC command information targets a sidelink control channel and sidelink traffic channel or targets a feedback channel for the sidelink.

7. The methods, apparatuses, and articles of any of clauses 1-6, further providing for including the TPC indicator in a SCI 1 message or a SCI 2 message of the SCI, and including the TPC message in the SCI 1 message or the SCI 2 message, wherein the TPC indicator indicates that the SCI includes the TPC message.

8. The methods, apparatuses, and articles of any of clauses 1-7, wherein the TPC message provides for a plurality of blocks each having a block index and each including respective TPC command information, wherein the block index of each block of the plurality of blocks provides a mapping between the block and a corresponding PSCCH and PSSCH for a sidelink or a corresponding PSFCH for the sidelink.

9. The methods, apparatuses, and articles of clause 8, wherein the respective TPC command information of each block of the plurality of blocks provides for one or more TPC command bits mapped to a corresponding power adjustment for carrying out with respect to the corresponding PSCCH and PSSCH or the corresponding PSFCH.

10. The methods, apparatuses, and articles of clause 8, wherein each block of the plurality of blocks includes at least one of a source ID or a destination ID specifying the sidelink to which a TPC command corresponding to the respective TPC command information applies.

11. The methods, apparatuses, and articles of any of clauses 1-10, further providing for receiving a sidelink communication, from the second UE, having transmit power adjusted in accordance with a TPC command corresponding to the TPC message.

12. Methods, apparatuses, and articles for wireless communication may provide for receiving, by a first UE from a second UE via a sidelink control channel portion of a sidelink communication between the second UE and the first UE, SCI that includes a TPC indicator and a TPC message, and receiving, from the second UE by the first UE via a sidelink traffic channel portion of the sidelink communication, sidelink traffic for the first UE.

13. The methods, apparatuses, and articles of clause 12, wherein the TPC indicator indicates that the SCI includes the TPC message.

14. The methods, apparatuses, and articles of clause 13, wherein the TPC indicator indicates that the SCI includes the TPC message based at least in part on one or more of a CRC of a SCI 1 message or a SCI 2 message scrambled using a TPC RNTI, a SCI 1 configuration or a SCI 2 configuration defined for TPC command information, one or more bits in SCI 1 or SCI 2 reserved for TPC indication, or one or more bits of SCI 1 or SCI 2 available for purposes other than TPC indication.

15. The methods, apparatuses, and articles of any of clauses 12-14, wherein the TPC message includes TPC command information with respect to a sidelink control channel and a sidelink traffic channel for a sidelink or a feedback channel for the sidelink, and wherein the SCI of the sidelink communication and the sidelink traffic of the sidelink communication are decoupled.

16. The methods, apparatuses, and articles of any of clauses 12-15, wherein the sidelink traffic comprises SPS communication of data unaccompanied by resource scheduling information for the data transmission in the SCI.

17. The methods, apparatuses, and articles of any of clauses 12-16, wherein the TPC indicator includes one or more bits indicating whether the TPC command information targets the sidelink control channel and the sidelink traffic channel for the sidelink or targets the feedback channel for the sidelink.

18. The methods, apparatuses, and articles of any of clauses 12-17, wherein the TPC indicator is included in a SCI 1 message or a SCI 2 message of the SCI, and wherein the TPC message is included in the SCI 1 message or the SCI 2 message, wherein the TPC indicator indicates that the SCI includes the TPC message.

19. The methods, apparatuses, and articles of any of clauses 12-18, wherein the TPC message provide for a plurality of blocks each having a block index and each including respective TPC command information, wherein the block index of each block of the plurality of blocks provides a mapping between the block and a corresponding PSCCH and PSSCH for a sidelink or a corresponding PSFCH for the sidelink.

20. The methods, apparatuses, and articles of clause 19, wherein the respective TPC command information of each block of the plurality of blocks provide for one or more TPC command bits mapped to a corresponding power adjustment for carrying out with respect to the corresponding PSCCH and PSSCH or the corresponding PSFCH.

21. The methods, apparatuses, and articles of clause 19, wherein each block of the plurality of blocks includes at least one of a source ID or a destination ID specifying the sidelink to which a TPC command corresponding to the respective TPC command information applies.

22. The methods, apparatuses, and articles of any of clauses 12-21, further providing for transmitting sidelink communications, to the second UE, having transmit power adjusted in accordance with a TPC command corresponding to the TPC message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1, 2 and 8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A first user equipment (UE) comprising:
a memory storing processor-readable code; and
at least one processor coupled to the memory, the at least one processor configured to execute the processor-readable code to cause the at least one processor to:
transmit, to a second UE via a sidelink control channel portion of a sidelink communication between the first UE and the second UE, sidelink control information (SCI) that includes a transmit power control (TPC) indicator and a TPC message, wherein the TPC indicator indicates that the SCI and sidelink traffic of the sidelink communication are decoupled; and
transmit, to the second UE via a sidelink traffic channel portion of the sidelink communication, the sidelink traffic for the second UE, wherein the sidelink traffic for the second UE and the SCI are decoupled.

2. The first UE of claim 1, wherein the TPC indicator also indicates that the SCI includes the TPC message.

3. The first UE of claim 2, wherein the TPC indicator indicates that the SCI includes the TPC message based at least in part on one or more of:
a cyclic redundancy check (CRC) of a SCI format 0-1 (SCI 1) message or a SCI format 0-2 (SCI 2) message scrambled using a TPC radio network temporary identifier (RNTI);
a SCI 1 configuration or a SCI 2 configuration defined for TPC command information;
one or more bits in SCI 1 or SCI 2 reserved for TPC indication; or
one or more bits of SCI 1 or SCI 2 available for purposes other than TPC indication.

4. The first UE of claim 1, wherein the TPC message includes TPC command information with respect to a sidelink control channel and a sidelink traffic channel for a sidelink or a feedback channel for the sidelink.

5. The first UE of claim 4, wherein the sidelink traffic comprises semi-persistent scheduling (SPS) transmission of data unaccompanied by resource scheduling information in the SCI for the sidelink traffic.

6. The first UE of claim 4, wherein the TPC indicator includes one or more bits indicating whether the TPC command information targets the sidelink control channel and the sidelink traffic channel or targets the feedback channel for the sidelink.

7. The first UE of claim 1, wherein the at least one processor is further configured to execute the processor-readable code to cause the at least one processor to:
include the TPC indicator in a SCI format 0-1 (SCI 1) message or a SCI format 0-2 (SCI 2) message of the SCI; and
include the TPC message in the SCI 1 message or the SCI 2 message, wherein the TPC indicator also indicates that the SCI includes the TPC message.

8. The first UE of claim 1, wherein the TPC message includes a plurality of blocks each being associated with a block index and each including respective TPC command information, and
wherein the block index associated each block of the plurality of blocks provides a mapping between the block and a corresponding physical sidelink control channel (PSCCH) and physical sidelink shared channel (PSSCH) for a sidelink or a corresponding physical sidelink feedback channel (PSFCH) for the sidelink.

9. The first UE of claim 8, wherein the respective TPC command information of each block of the plurality of blocks includes one or more TPC command bits mapped to a corresponding power adjustment for carrying out with respect to the corresponding PSCCH and PSSCH or the corresponding PSFCH.

10. The first UE of claim 8, wherein each block of the plurality of blocks includes at least one of a source identifier (ID) or a destination ID specifying the sidelink to which a TPC command corresponding to the respective TPC command information applies.

11. The first UE of claim 1, wherein the at least one processor is further configured to execute the processor-readable code to cause the at least one processor to:
receive sidelink communications, from the second UE, having transmit power adjusted in accordance with a TPC command corresponding to the TPC message.

12. A method of wireless communication, comprising:
transmitting, by a first user equipment (UE) to a second UE via a sidelink control channel portion of a sidelink communication between the first UE and the second UE, sidelink control information (SCI) that includes a transmit power control (TPC) indicator and a TPC message, wherein the TPC indicator indicates that the SCI and sidelink traffic of the sidelink communication are decoupled; and
transmitting, by the first UE to the second UE via a sidelink traffic channel portion of the sidelink communication, the sidelink traffic for the second UE, wherein the sidelink traffic for the second UE and the SCI are decoupled.

13. The method of claim 12, wherein the TPC message includes TPC command information with respect to a sidelink control channel and a sidelink traffic channel for a sidelink or a feedback channel for the sidelink.

14. The method of claim 12, further comprising:
including the TPC indicator in a SCI format 0-1 (SCI 1) message or a SCI format 0-2 (SCI 2) message of the SCI; and
including the TPC message in the SCI 1 message or the SCI 2 message,
wherein the TPC indicator also indicates that the SCI includes the TPC message.

15. The method of claim 12, wherein the TPC message includes a plurality of blocks each being associated with a block index and each including respective TPC command information, and
wherein the block index associated with each block of the plurality of blocks provides a mapping between the block and a corresponding physical sidelink control channel (PSCCH) and physical sidelink shared channel (PSSCH) for a sidelink or a corresponding physical sidelink feedback channel (PSFCH) for the sidelink.

16. A first user equipment (UE) comprising:
a memory storing processor-readable code; and
at least one processor coupled to the memory, the at least one processor configured to execute the processor-readable code to cause the at least one processor to:
receive, from a second UE via a sidelink control channel portion of a sidelink communication between the second UE and the first UE, sidelink control information (SCI) that includes a transmit power control (TPC) indicator and a TPC message, wherein the TPC indicator indicates that the SCI and sidelink traffic of the sidelink communication are decoupled; and
receive, from the second UE via a sidelink traffic channel portion of the sidelink communication, the sidelink traffic for the first UE, wherein the sidelink traffic for the second UE and the SCI are decoupled.

17. The first UE of claim 16, wherein the TPC indicator also indicates that the SCI includes the TPC message.

18. The first UE of claim 17, wherein the TPC indicator indicates that the SCI includes the TPC message based at least in part one or more of:
a cyclic redundancy check (CRC) of a SCI format 0-1 (SCI 1) message or a SCI format 0-2 (SCI 2) message scrambled using a TPC radio network temporary identifier (RNTI);
a SCI 1 configuration or a SCI 2 configuration defined for TPC command information:
one or more bits in SCI 1 or SCI 2 reserved for TPC indication: or
one or more bits of SCI 1 or SCI 2 available for purposes other than TPC indication.

19. The first UE of claim 16, wherein the TPC message includes TPC command information with respect to a sidelink control channel and a sidelink traffic channel for a sidelink or a feedback channel for the sidelink.

20. The first UE of claim 19, wherein the sidelink traffic comprises semi-persistent scheduling (SPS) communication of data unaccompanied by resource scheduling information in the SCI for the sidelink traffic.

21. The first UE of claim 19, wherein the TPC indicator includes one or more bits indicating whether the TPC command information targets the sidelink control channel and the sidelink traffic channel for the sidelink or targets the feedback channel for the sidelink.

22. The first UE of claim 16, wherein the TPC indicator is included in a SCI format 0-1 (SCI 1) message or a SCI format 0-2 (SCI 2) message of the SCI, and
wherein the TPC message is included in the SCI 1 message or the SCI 2 message, wherein the TPC indicator also indicates that the SCI includes the TPC message.

23. The first UE of claim 16, wherein the TPC message includes a plurality of blocks each being associated with a block index and each including respective TPC command information, and
wherein the block index associated with each block of the plurality of blocks provides a mapping between the block and a corresponding physical sidelink control channel (PSCCH) and physical sidelink shared channel (PSSCH) for a sidelink or a corresponding physical sidelink feedback channel (PSFCH) for the sidelink.

24. The first UE of claim 23, wherein the respective TPC command information of each block of the plurality of blocks includes one or more TPC command bits mapped to a corresponding power adjustment for carrying out with respect to the corresponding PSCCH and PSSCH or the corresponding PSFCH.

25. The first UE of claim 23, wherein each block of the plurality of blocks includes at least one of a source identifier (ID) or a destination ID specifying the sidelink to which a TPC command corresponding to the respective TPC command information applies.

26. The first UE of claim 16, wherein the at least one processor is further configured to execute the processor-readable code to cause the at least one processor to:
transmit sidelink communications, to the second UE, having transmit power adjusted in accordance with a TPC command corresponding to the TPC message.

27. A method of wireless communication, comprising:
receiving, by a first user equipment (UE) from a second UE via a sidelink control channel portion of a sidelink communication between the second UE and the first UE, sidelink control information (SCI) that includes a transmit power control (TPC) indicator and a TPC message, wherein the TPC indicator indicates that the SCI and sidelink traffic of the sidelink communication are decoupled; and
receiving, from the second UE by the first UE via a sidelink traffic channel portion of the sidelink communication, the sidelink traffic for the first UE, wherein the sidelink traffic for the second UE and the SCI are decoupled.

28. The method of claim 27, wherein the TPC message includes TPC command information with respect to a sidelink control channel and a sidelink traffic channel for a sidelink or a feedback channel for the sidelink.

29. The method of claim 27, wherein the TPC indicator is included in a SCI format 0-1 (SCI 1) message or a SCI format 0-2 (SCI 2) message of the SCI, and wherein the TPC message is included in the SCI 1 message or the SCI 2 message,
   wherein the TPC indicator also indicates that the SCI includes the TPC message.

30. The method of claim 27, wherein the TPC message includes a plurality of blocks each being associated with a block index and each including respective TPC command information, and
   wherein the block index associated with each block of the plurality of blocks provides a mapping between the block and a corresponding physical sidelink control channel (PSCCH) and physical sidelink shared channel (PSSCH) for a sidelink or a corresponding physical sidelink feedback channel (PSFCH) for the sidelink.

* * * * *